United States Patent
Rothenberger

(10) Patent No.: US 12,484,734 B2
(45) Date of Patent: Dec. 2, 2025

(54) GRILL

(71) Applicant: Walter Werkzeuge Salzburg GmbH, Anif (AT)

(72) Inventor: Helmut Rothenberger, Frankfurt am Main (DE)

(73) Assignee: Walter Werkzeuge Salzburg GmbH, Anif (AT)

( * ) Notice: Subject to any disclaimer, the term of this patent is extended or adjusted under 35 U.S.C. 154(b) by 695 days.

(21) Appl. No.: 17/700,208

(22) Filed: Mar. 21, 2022

(65) Prior Publication Data

US 2022/0296041 A1  Sep. 22, 2022

(30) Foreign Application Priority Data

Mar. 22, 2021 (EP) .................................... 21164019

(51) Int. Cl.
*A47J 37/07* (2006.01)
*A47J 37/08* (2006.01)

(52) U.S. Cl.
CPC ....... *A47J 37/0727* (2013.01); *A47J 37/0807* (2013.01)

(58) Field of Classification Search
CPC ............... A47J 37/0727; A47J 37/0807; A47J 37/0688; A47J 37/0718; A47J 37/0731; A47J 37/00; A47J 37/0722; F24C 3/00
USPC ...................................... 126/25 R
See application file for complete search history.

(56) References Cited

U.S. PATENT DOCUMENTS

| | | | | |
|---|---|---|---|---|
| 2,397,040 A | * | 3/1946 | Pallich | A47J 37/0688 99/392 |
| 2,514,618 A | * | 7/1950 | Ancell | |
| 3,052,177 A | * | 9/1962 | Lombardo | A47J 37/06 99/390 |
| 4,627,410 A | * | 12/1986 | Jung | A47J 37/00 126/25 |
| 4,647,758 A | * | 3/1987 | Kelian | A47J 37/0688 99/449 |

(Continued)

FOREIGN PATENT DOCUMENTS

| | | | | |
|---|---|---|---|---|
| CA | 2791304 A1 | * | 9/2011 | .......... A47J 37/0629 |
| CN | 960005705 Y1 | * | 7/1996 | ............. A47J 36/26 |

(Continued)

OTHER PUBLICATIONS

Chinese to English machine translation for CN204351652U.*

*Primary Examiner* — Michael G Hoang
*Assistant Examiner* — Elizabeth Ann Laughlin
(74) *Attorney, Agent, or Firm* — Smartpat PLC

(57) ABSTRACT

A grill for cooking and grilling food includes a housing which defines an internal grilling space and a first side wall (6). A second side wall (7) is situated opposite the first side wall. The grill includes a cover wall (4), a rear wall (9), and a base plate (3). The internal grilling space has a vertical grilling zone. At least two radiant heaters (1, 2) are introduced inside the internal grilling space, situated opposite the first and second side wall (6, 7). The radiant heaters (1, 2) are preferably gas burners. A grilling basket (5) can be introduced vertically between the two radiant heaters (1, 2). The cover wall (4) has an opening (4') through which the grilling basket (5) can be introduced into the internal grilling space. The front side (8) of the grill comprises a viewing opening.

13 Claims, 3 Drawing Sheets

(56) References Cited

U.S. PATENT DOCUMENTS

| | | | | |
|---|---|---|---|---|
| 5,499,574 | A * | 3/1996 | Esposito | A47J 37/08 99/339 |
| 5,918,536 | A * | 7/1999 | Cheng | A47J 37/00 99/447 |
| 5,960,783 | A * | 10/1999 | Schubert et al. | F24C 3/00 126/41 |
| 6,125,234 | A | 9/2000 | de Jenlis | |
| 8,490,614 | B1 * | 7/2013 | Gregory | A47J 37/00 126/41 |
| 10,278,540 | B1 | 5/2019 | Huggins | |
| 2001/0039884 | A1 * | 11/2001 | Backus | F24C 15/325 99/421 V |
| 2005/0019716 | A1 * | 1/2005 | Fernandez | F23N 1/002 431/24 |
| 2006/0042620 | A1 * | 3/2006 | Luoma | A47J 37/00 126/25 |
| 2015/0053093 | A1 | 2/2015 | Chang | |
| 2015/0208863 | A1 | 7/2015 | Buzick et al. | |
| 2017/0027382 | A1 * | 2/2017 | Firtel | A47J 37/0688 |
| 2023/0106349 | A1 | 4/2023 | Buzick et al. | |
| 2023/0255388 | A1 | 8/2023 | Gray et al. | |

FOREIGN PATENT DOCUMENTS

| | | | | |
|---|---|---|---|---|
| CN | 204351652 U | * | 5/2015 | A47J 37/06 |
| DE | 202007002076 U1 | * | 2/2007 | A47J 37/0786 |
| DE | 202018105879 U1 | | 10/2018 | |
| DE | 202020001708 U1 | | 5/2020 | |
| EP | 2557974 A1 | | 2/2013 | |
| EP | 3708042 A1 | * | 9/2020 | A47J 37/0647 |
| FR | 2763233 A1 | | 11/1998 | |
| JP | H02172421 A | * | 7/1990 | A47J 37/08 |
| JP | 6078296 B2 | * | 2/2017 | A47J 37/0636 |
| KR | 20090013113 U | | 12/2009 | |
| KR | 200468711 | | 8/2013 | |
| KR | 200468711 Y1 | * | 8/2013 | A47J 37/0821 |
| WO | WO-2011060572 A1 | * | 5/2011 | A47J 37/0814 |
| WO | 2019068202 A1 | | 4/2019 | |

* cited by examiner

GRILL

CROSS-REFERENCE TO RELATED APPLICATION

This application claims the benefit of European Patent Application No. 21164019, filed 22 Mar. 2021, which is hereby incorporated by reference in its entirety.

TECHNICAL FIELD

The disclosure relates to a grill for cooking and grilling food.

BACKGROUND

Because of the high temperatures of up to 800° C., top heat grills make it possible to obtain distinctive flavors and grilled food which stays tender and juicy on the inside whilst a perfect crust is formed on the outside. However, in top heat grills the food being grilled is always cooked with a high heat on just one side and it is only possible to obtain a perfect crust on both sides by turning over the food being grilled. However, this means that the already grilled side is cooked again, which is not desired. It is therefore only possible to obtain a perfect result by simultaneously cooking both sides.

Vertical grills enable such a perfect crust on both sides by cooking the food being grilled with high heat simultaneously from both sides. Vertical grills with differently powered heat sources are generally known from the prior art.

DE 20 2020 001 708 U1 discloses a gas-powered vertical grill in which the vertical heat sources are mounted on a rear wall and can be rotated by 90°. Thus, on the one hand, food can be grilled on both sides and, on the other hand, the grill can be used as a top heat grill. However, the grill does not have a housing, which means that a lot of heat is lost.

DE 20 2018 105 879 U1 discloses a gas-powered vertical grill which comprises burner elements which are situated opposite each other and arranged in a V-shape, wherein the food to be grilled can be introduced into the internal grilling space from the top. The top can be closed by means of chimney closure plates in order thus to control the regulation of the heat in the grilling space and suppress a chimney effect. By closing the internal grilling space, it is impossible for heat to escape and thus a constant and very high temperature level can be maintained over a longer time.

EP 2 557 974 B1 also discloses a similar electric vertical grill which likewise comprises a closed housing into which the food to be grilled can be introduced from above in a grilling basket. The fat from the grilled food is thus removed from the grill during cooking in the most efficient manner possible.

The known vertical grills thus, on the one hand, have the disadvantage that the food cannot be watched whilst it is being grilled. In order to obtain a perfect result, the food must therefore be removed from the grill more often in order to check the progress of the grilling. If the food being grilled is inspected too late, this can easily cause unwanted burnt areas on the outer layer.

On the other hand, in the case of the known vertical grills, the food is grilled only by means of the heat sources at the sides, as a result of which the food must usually be precooked and/or recooked. The known grills do not allow a favorable grilling climate for precooking or recooking, as a result of which a further appliance is usually required for this in order to obtain a perfect result.

SUMMARY

An object of the disclosure is to provide a flexible vertical grill which can be used in all contexts and with which the desired grilled food can be prepared perfectly with no defects and very simply.

This object is achieved by a grill for cooking and grilling food to be grilled, that comprises a housing which defines an internal grilling space and has a first side wall. A second side wall is situated opposite the first side wall. A cover wall, a rear wall, and a base plate are provided. The internal grilling space has a vertical grilling zone. At least two radiant heaters are introduced inside the internal grilling space, situated opposite the first and second side wall. The radiant heaters are preferably gas burners. A grilling basket can be introduced vertically between the two radiant heaters. The cover wall has an opening through which the grilling basket can be introduced into the internal grilling space. The front side of the grill has a viewing opening.

The grilling basket with the food to be grilled is introduced into the internal grilling space through the opening in the cover wall. The grilling basket is preferably accommodated in the housing such that it can be positioned essentially centrally between the two radiant heaters. The food being grilled can be grilled uniformly on both sides by the radiant heaters. Because of the structure of the grill, a chimney effect can additionally result inside the internal grilling space which effects the circulation of hot air around the food being grilled. Fresh air which is heated to a high temperature in the region of the heating plates and thus rises up can additionally pass into the internal grilling space through the viewing opening in the front side of the grill. The heated air can escape at the opening in the cover wall, as a result of which reduced pressure is created in the internal grilling space which in turn draws fresh air into the internal grilling space through the opening in the front side. Consequently, heated air constantly circulates around the food being grilled which is simultaneously grilled by means of high heat on both sides by the radiant heaters and by means of circulating hot air. For example, the pores of a steak are thus instantly sealed by the high heat, as a result of which the juice remains inside the grilled food. However, in addition the food to be grilled also does not need to be pretreated because the circulating hot air cooks the food being grilled or the steak as well. For example, after the pores have been sealed by being grilled at a very high heat of over 800° C., the temperature of the radiant heaters can be reduced and the cooking of the food being grilled can be finished with the aid of the circulating hot air. Larger pieces of grilled food can also be prepared with the grill without burning its outer layer. Because of the circulating hot air, the heat can also penetrate inside without the radiant heaters burning the outer layer.

The food being grilled can be constantly watched whilst it is grilling through the viewing opening in the front side of the grill. The temperature can thus be regulated very simply by a visual check and burning of the food being grilled can be prevented simply. To summarize, the food can remain in the grill during the whole grilling process. By visually monitoring the cooking, the risk of injury, specifically burns, to people using the grill is reduced because they do not have to handle the food during the grilling.

The viewing opening is particularly preferably configured in such a way that both sides of the food being grilled in the internal grilling space can be checked during the grilling through the viewing opening. This is made possible, inter alia, by the vertical fit of the grilling basket, the long sides of which stand essentially vertically against the front side of the grill or extend essentially parallel to the radiant heaters such that the food being grilled is situated between the two radiant heaters. Both sides of the food being grilled which has been introduced into the grilling basket can therefore be viewed from the front side. Thus, in this alternative embodiment, the viewing opening would be positioned on the front side, in front of the introduced food being grilled.

In a further alternative embodiment, the internal grilling space can be accessed through the viewing opening. The viewing opening can, for example, be configured in such a way that the internal grilling space can be cleaned, through the viewing opening, when the grill is not being used. In this embodiment, the viewing opening on the front side is large enough for a user of the grill to pass their hand through the viewing opening into the internal grilling space in order to be able to clean the internal grilling space. The majority of the front side of the grill can, for example, be open such that the viewing opening extends over the whole front side.

The grill can have the shape of a cuboid, wherein the side walls are designed to be longer than the front and rear sides of the grill.

The grilling basket consists essentially of two grill grates which are situated opposite each other and can be bent at the top in order thus to be able to lie on the outside of the cover wall. The grilling basket can also have one or two handles at the top by means of which the basket can be simply inserted into the internal grilling space and removed from it again. The grill grates are, depending on the thickness of the food being grilled, arranged essentially in parallel or in a V-shape. The two grill grates are connected to each other on the underside of the grilling basket such that the food being grilled does not fall out.

The width of the grilling basket can particularly preferably be adjusted. As a result, food of different thicknesses can be introduced into the grilling basket. The width is here set by means of the connection of the grill grates to the underside of the grilling basket. The width can be adjusted continuously or in a plurality of increments.

In a further preferred alternative embodiment, the grilling basket has an upwardly curved V-shape. Food to be grilled can thus be introduced vertically into the grilling basket, whilst the curved V-shape of the grilling basket at the top makes it possible for bread or the like to be toasted or kept warm on the top whilst the food is being grilled inside the grill. The bread can thus lie on the top of the grill on the grilling basket and be positioned over the opening on the cover wall. Hot air consequently flows constantly around the bread. In a similar fashion to an oven, the bread or the like can thus be toasted, baked or kept warm with the aid of the hot air.

In an embodiment, the grill comprises a pivotable front flap. The front flap can, for example, be attached to the base plate so that it is fastened pivotably by means of a hinge. The axis of rotation of the hinge is here oriented essentially horizontally. The viewing opening can be closed by the front flap.

The front flap can be closed in order to store the grill and prevent the ingress of dirt. In an alternative embodiment, it is provided that the front flap can be closed by means of a magnetic closure on the external housing. The front flap can furthermore form an extension of the base plate when open. The front flap consequently offers protection from the radiant heat from the internal grilling space which strikes the front flap instead of directly striking the tabletop. This is facilitated when the front flap has a handle, wherein the depth of the handle essentially corresponds to the distance between the axis of rotation of the hinge and the base.

The front flap preferably comprises a viewing panel which is preferably made from transparent plastic or glass. When the front side is closed, the viewing panel makes it possible to look inside the grill and hence monitor the food being grilled. It is also possible for the whole front flap to have a transparent design, for example in the form of a glass front flap. A glass front flap or viewing panel also makes cleaning very easy.

In a further alternative embodiment, the grill comprises a front cover, attached to the housing, which can comprise a screen and has an opening. The foldable front flap can be attached to the underside of the front cover. The front flap can preferably cover the whole viewing opening such that the grill can be stored when closed and it is possible to grill even with the front flap closed.

In a further alternative embodiment, the grill comprises a removable drip tray, wherein the drip tray can be placed on the base plate. Because juice and fat drip down from the food when it is being grilled vertically, the removable drip tray offers the advantage that cleaning after grilling is easy. The tray can preferably be cleaned in a dishwasher. The internal grilling space thus remains untouched by any substantial soiling and there is no need for time-consuming cleaning after each use. The juice and fat collected in the drip tray can moreover also be reused to prepare sauces, for example.

A pair of essentially horizontally oriented guides which are arranged on the first and second side wall in each case at the same height below the radiant heaters are preferably situated in the internal grilling space. A further grill grate, on which food can be cooked or kept warm, can be attached to these guides. For example, the grilled food can also be reintroduced into the grill after it has been prepared and the radiant heaters can be switched off. Because the front flap is closed, heat can remain in the grill and the grilled food kept warm. The guides can here be rails, for example.

In a particularly preferred alternative embodiment, the radiant heaters are gas burners. They are each connected to a gas supply line, wherein each gas supply line has a connector for a gas cartridge, wherein the gas cartridges can be arranged on the outside of the housing. The gas supply lines can be opened and closed by a valve. The gas supply lines preferably extend along the grill from the radiant heaters to the respective connector. The use of gas cartridges makes it possible to transport the grill flexibly without constantly connecting and dismantling a gas canister. The grill can moreover also be used with gas cartridges indoors. The gas cartridges can be multiple gas cartridges in an alternative embodiment.

In an alternative embodiment, it is provided that each connector has a connection valve for the gas cartridges which is connected to the gas supply line. It is preferably provided here that each connector sits directly behind the cover wall.

A connection plate for fastening the connectors for the gas cartridges can be attached to the underside of the cover wall in the region behind the rear wall. The at least two gas cartridges can additionally be pushed through holes in the base plate behind the rear side of the rear wall and thus fixed to the connector, wherein the holes in the base plate can be closed by means of base brackets after the gas cartridges have been fixed. The gas cartridges are then fastened stably behind the rear wall and can additionally in each case be further shielded by a cover screen attached to the base plate.

The gas supply to the radiant heaters can furthermore be controlled by a controller, wherein the controller controls the amount of gas allowed to pass through from the gas cartridges to the gas burner. The at least one gas supply line can here be opened and closed by a valve, and a rotary switch situated downstream can additionally control the amount of gas allowed to pass through to the radiant heaters. The temperature of the grill can thus be set by means of the controller or the rotary switch. The amount of gas may also be controlled with the aid of the connection valve and the supply of gas can be switched on and off with the aid of the connection valve.

In a further alternative embodiment, the housing of the grill comprises a removable cover which can be attached to the rear side of the grill. The gas cartridges can be arranged between the rear wall and the cover. The gas cartridges can thus be installed safely in order to make it easier to transport the grill. Independently of the removable cover, the gas cartridges can preferably stand on the base plate of the housing, which therefore projects above the rear wall, as long as they have not yet been connected to the grill.

The installation and use of the gas cartridges which have just been described therefore allows the grill to be transported flexibly without constantly connecting and dismantling a gas canister. The grill can moreover also be used with gas cartridges indoors.

The radiant heaters are preferably ignited electrically by a push-button, wherein the ignition device is, for example, a piezoelectric igniter. Each of the two radiant heaters can comprise an ignition device which in each case ignites one of the radiant heaters. The switch or push-button for the electric ignition devices is preferably situated on the outside of the housing, for example on the rear side of the grill. The switch or push-button is particularly preferably integrated into the controller. Both radiant heaters can consequently be ignited by pushing the controller. Two switches can also be provided which each ignite one of the radiant heaters.

In a further alternative embodiment, the housing can have additional ventilation openings. On the one hand, gases from burning, smoke or fumes can escape from the internal grilling space and, on the other hand, they can assist the chimney effect. For example, fresh air can pass into the internal grilling space through the ventilation openings when the front flap is closed.

The grill can moreover comprise an integrated time switch for very precise preparation of the food to be grilled. The time switch can additionally activate and deactivate the radiant heaters in order to prevent heat from being supplied to the food being grilled for too long.

In order to make it as simple as possible to transport the grill, a carrying handle can be situated on the outer cover wall.

In a further alternative embodiment, the grill comprises an outer housing which leaves the viewing opening free. The outer housing can comprise two outer side walls, an outer cover wall, and possibly an outer rear wall. A front cover which comprises a screen on the top can furthermore be attached to the outer housing. The foldable front flap can be attached to the underside of the front cover. A possible front cover also leaves the viewing opening open.

When the outer housing comprises an outer rear wall, the latter is arranged behind the rear wall. The two connectors for the gas cartridges can then be arranged between the outer rear wall and the rear wall or they can be arranged behind the outer rear wall.

A further alternative embodiment provides at least one detachably fixable branding iron. The branding iron can have a logo, lettering, numbers, letters, or combinations thereof. Patterns or names or words can be burnt into the grilled food with the aid of the branding iron. A personalized steak can thus, for example, be prepared with the aid of the branding iron. The branding iron can be moved towards and away from the grilling basket by means of a guide.

The following detailed description is merely exemplary in nature and is not intended to limit the invention or the application and uses of the invention. Furthermore, there is no intention to be bound by any theory presented in the preceding background or the following detailed description.

DETAILED DESCRIPTION

Figure 1:
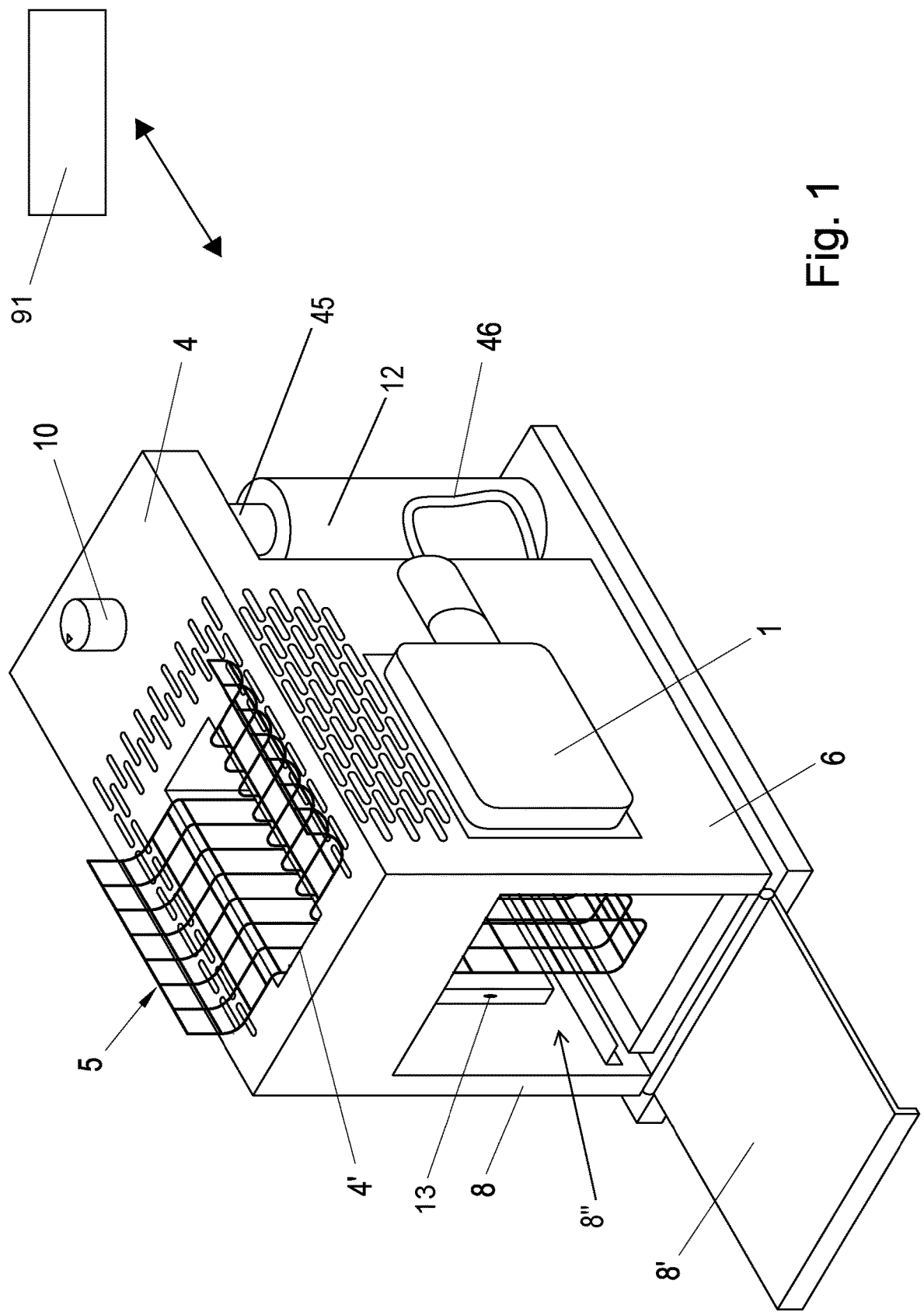
FIG. 1 shows a perspective view of a grill.

FIGS. 1 to 4 show a grill for cooking and grilling food, comprising a housing which defines the internal grilling space. The internal grilling space has a vertical grilling zone. The housing comprises a first side wall 6, a second side wall 7 which is situated opposite the first side wall 6, a cover wall 4, a rear wall 9 and a base plate 3. The grill moreover comprises a grilling basket 5 which can be introduced vertically into the internal grilling space. The cover wall 4 has an opening 4' through which the grilling basket 5 can be introduced into the internal grilling space. The internal grilling space can be accessed from a viewing opening 8" on the front side 8 and from the opening 4' on the cover wall 4. The first side wall (6), the second side wall (7), and the rear wall (9) extend upwardly from the base plate (3). The cover wall (4) extends between upper ends of the first side wall (6), the second side wall (7), and the rear wall (9) and may be referred to as a top cover wall (4).

Two radiant heaters 1, 2 are furthermore attached to the first and second side wall 6, 7 of the internal grilling space. In the alternative embodiments shown in FIGS. 1-4, the radiant heaters 1, 2 are gas burners. In the alternative embodiments shown in FIGS. 1-4, the radiant heaters 1, 2 are installed in the side walls 6, 7, i.e. the side walls 6, 7 each have recesses in which the radiant heaters 1, 2 can be fixed.

Figure 2:
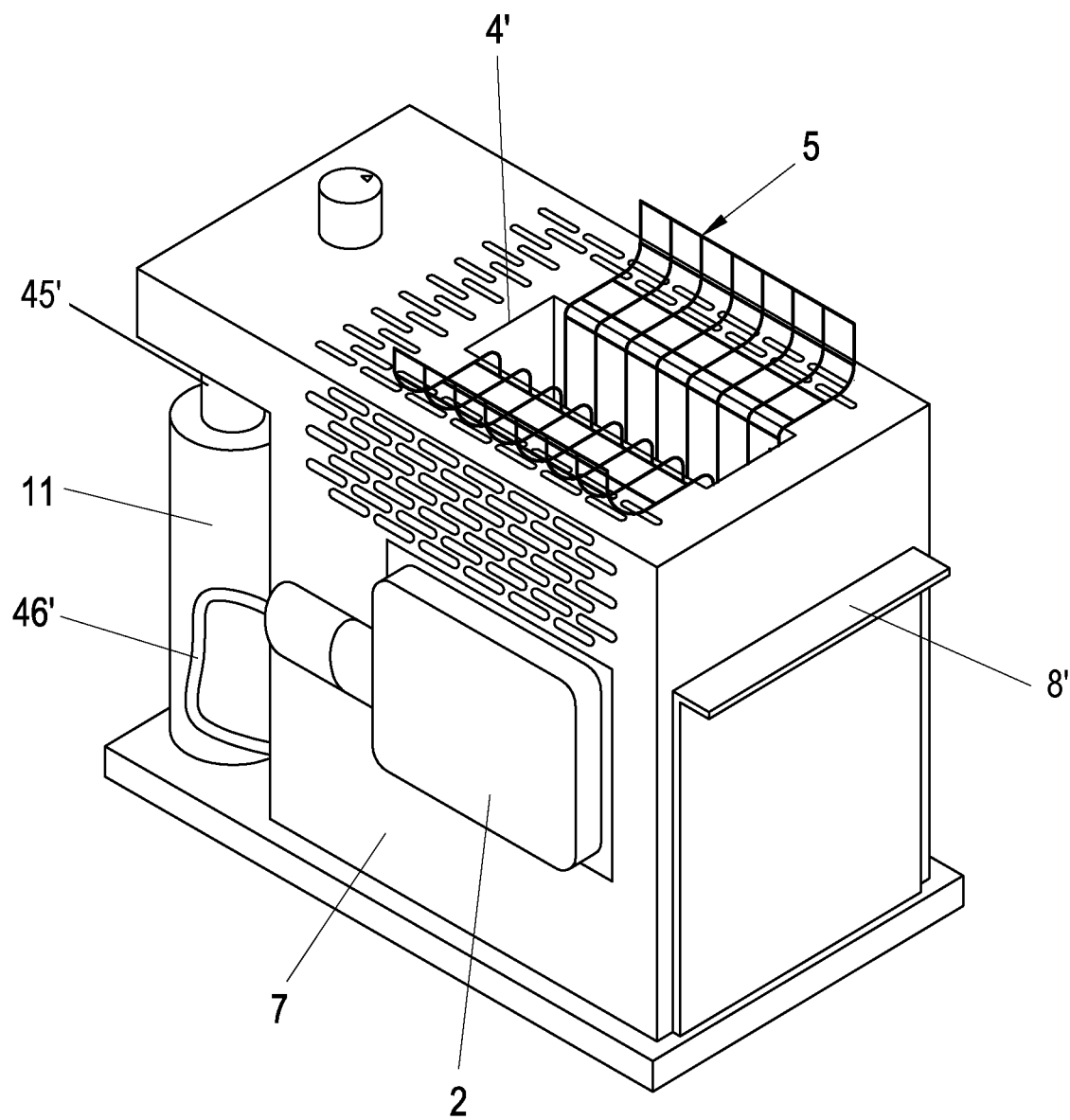
FIG. 2 shows a perspective view of the grill with a closed front flap.

A pivotable front flap 8' is also present which, when closed as illustrated in FIG. 2, closes the open region of the front side 8, i.e. the viewing opening 8". When closed, the front flap 8' can be closed on the housing by means of a magnetic closure or connected magnetically to the housing. When open, the front flap 8' forms an extension of the base plate 3. The front flap 8' is preferably fastened on the base plate 3 by means of horizontally arranged hinges. The front flap 8' can comprise a projecting handle which has a depth which corresponds to the height of the axis of rotation of the hinges above the base. The front flap 8' can have a transparent design and comprise, for example, a glass front flap 8'. The whole front flap 8' can have a transparent design or just a viewing panel which is preferably fabricated from transparent plastic or glass. The viewing panel is arranged in the region of the front flap 8' in such a way that the food can be checked visually through the viewing panel when it is being cooked. As a result, the food being grilled inside the grill can be observed even when the front flap 8' is closed.

A pair of essentially horizontally oriented guides 6', 7' can be arranged below the radiant heaters 1, 2. This pair of guides 6', 7' takes the form of guide rails. A grill grate can be guided on the pair of guides 6', 7'.

The front side 8 can comprise a screen at the top.

As can be seen in FIGS. 1 and 2, two gas supply lines 46, 46' with connectors 45, 45' for the gas cartridges 11, 12 are present, wherein the two connectors 45, 45' are preferably arranged on the outside of the rear wall 9 below the cover wall 4. The gas supply lines 46, 46' can also, as shown in FIGS. 1 and 2, run on the outside of the rear wall as far as the respective radiant heater 1, 2 on the outside of the side walls 6, 7. The gas supply lines 46, 46' thus connect each of the connectors to one of the radiant heaters 1, 2. The connectors 45, 45' can have a connection valve for the gas cartridges 11, 12.

The supply of gas to the radiant heaters 1, 2 is particularly preferably controlled by a controller 10. The controller 10 controls the amount of gas allowed to pass through to the radiant heaters 1, 2 from the gas cartridges 11, 12. The controller 10 can, as illustrated in FIGS. 1-4, be a rotary controller which can be arranged on the outside of the cover wall 4. In addition, the grill can also have two electric ignition devices 13 which are preferably piezoelectric igniters. The push-button for the ignition can be integrated into the controller 10. The controller 10 can then not only be rotated but also pushed down, as a result of which both heating plates 1, 2 are ignited when the gas supply is open.

The gas cartridges 11, 12 are preferably arranged on the outside of the rear wall 9. The gas cartridges 11, 12 can stand on the base plate 3 of the housing, which preferably projects above the rear wall 9. A removable cover 91 can moreover be arranged on the outside of the rear wall behind the gas cartridges 11, 12. This cover 91 can be arranged on the rear side of the housing and serves to cover the gas cartridges 11, 12. The removable cover can also have larger dimensions and additionally cover the majority of the side walls 6, 7. The cover would also cover and protect the outside of the radiant heaters 1, 2 and the gas supply lines 46, 46'.

A further essential advantage of the gas cartridges 11, 12 is their small size and the small amount of gas in the cartridges in contrast to a gas canister, for which reason a plurality of gas cartridges can also be stored. There is thus no need to constantly check whether there is still sufficient gas and the gas cartridges 11, 12 can be replaced very quickly and simply by one of the stored full gas cartridges. As well as flexibility and safety, the use of gas cartridges 11, 12 additionally has a lower environmental impact. In the case of the grill according to the disclosure, the emission of $CO_2$ is additionally also minimized by the use of the chimney effect because the grill can be operated more economically. The hot air which circulates around the food being grilled makes it possible to cook the food, whilst the heating plates sear the food to be grilled on both sides with high heat for just a short period of time.

Figure 4:
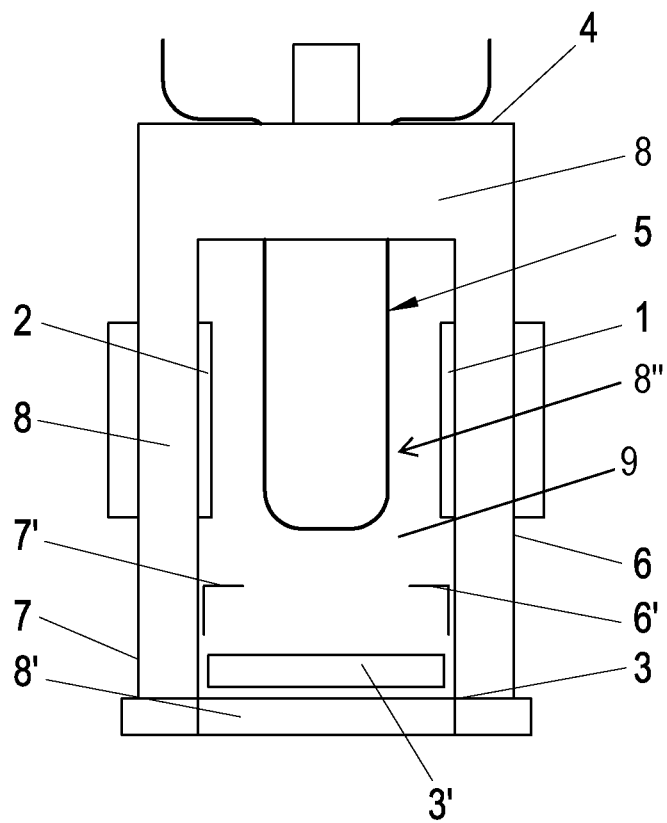
FIG. 4 shows a front view of the grill as in FIG. 1.

The width of the grilling basket 5 can furthermore be adjusted. In FIG. 4, the side walls of the grilling basket 5 are arranged essentially parallel and can thus hold relatively large pieces of food to be grilled. The width of the grilling basket 5 can particularly preferably be adjusted on the underside such that the side walls of the grilling basket 5 are arranged in a V-shape. As a result, the distance between the side walls and thus also the volume which can be held by the grilling basket 5 is reduced. The grilling basket 5 can preferably be adjusted continuously in order to be able to hold a wide range of food to be grilled in optimal fashion.

As illustrated in the alternative embodiments in FIGS. 1, 2 and 4, the grilling basket 5 can have a curved shape at the top. A part of the top of the grilling basket 5 here lies on the cover wall 4 of the grill. The grilling basket 5 can be removed from the grill and introduced into the grill very simply with the aid of the curved ends. Bread can, for example, be heated or baked on the surface of the grilling basket 5 which lies on the cover wall 4, whilst grilled food is prepared inside the grill in the grilling basket 5. The heat which rises upwards and escapes through the opening 4' can thus also be used very effectively.

In a further alternative embodiment, the grill comprises a removable drip tray 3' which, as shown in FIGS. 1 and 4, can be placed on the base plate 3. Depending on the type of food being grilled, juice, fat or the like can drip down during grilling from the food which has been introduced into the grilling basket 5. The drip tray 3' makes it possible to collect this juice and fat, as a result of which, on the one hand, it is easier to clean the grill because the removable drip tray 3' can be cleaned easily and, on the other hand, the juice and fat can be reused to make a sauce or the like.

Figure 3:
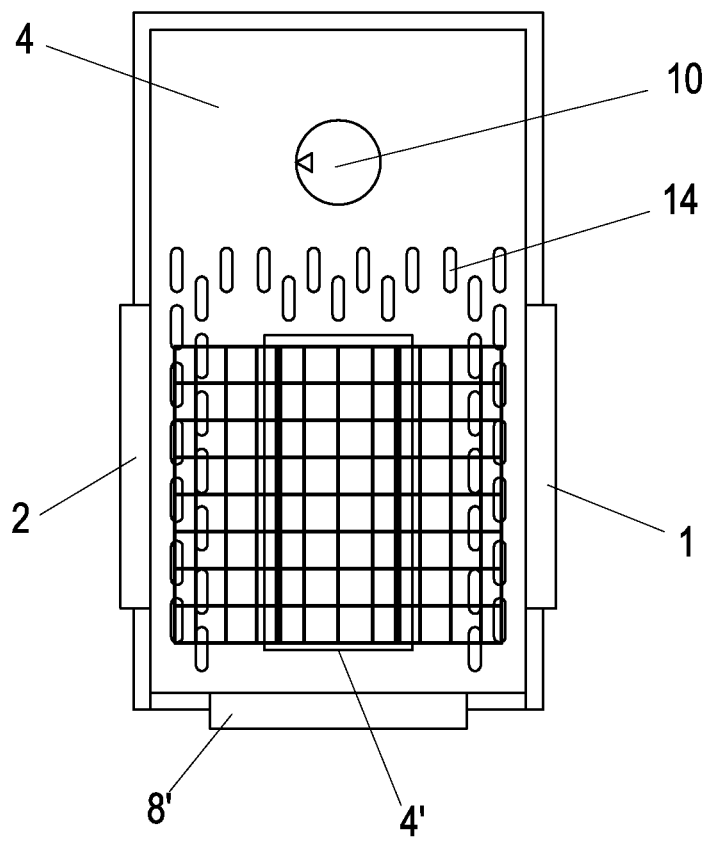
FIG. 3 shows a plan view of the grill according to FIG. 1.

As illustrated in FIGS. 1-3, the housing can have a plurality of ventilation openings 14. These can be attached to the cover wall 4 and to the side walls 6, 7. The ventilation openings 14 can be slot-like cutouts. Warm or hot air can escape through these ventilation openings 14 in order to assist the chimney effect. Moreover, gases from burning, smoke and fumes which would otherwise collect inside the grill can also escape through the ventilation openings 14. Fresh air flows into the internal grilling space through the ventilation openings 14 on the underside of the grill in order to enable the chimney effect even when the front flap 8' is closed.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A grill for cooking and grilling food to be grilled, comprising:
    a housing which defines an internal grilling space, the housing comprising
    a first side wall (6),
    a second side wall (7) situated opposite the first side wall,
    a top cover wall (4),
    a rear wall (9), and
    a base plate (3),
    wherein the first side wall (6), the second side wall (7), and the rear wall (9) extend upwardly from the base plate (3), and
    wherein the top cover wall (4) extends from the rear wall (9) between upper ends of the first side wall (6), and the second side wall (7), and
    wherein the internal grilling space has a vertical grilling zone;
    at least two radiant heaters (1, 2) which are arranged inside the internal grilling space, situated opposite the first and second side wall (6, 7);
    a grilling basket (5) which can be introduced vertically between the two radiant heaters (1, 2);
    an opening (4') formed in the top cover wall (4) through which the grilling basket (5) can be lowered into the internal grilling space;
    a viewing opening (8") arranged in a front side (8) of the grill;
    a pivotable front flap (8') arranged to pivot up and down about a horizontal axis relative to the base plate (3), wherein the viewing opening (8") can be closed by the pivotable front flap (8'); and two electric ignition devices (13) in form of piezoelectric igniters.

2. The grill according to claim 1, wherein a top portion of the grilling basket (5) lies on the top cover wall (4) when the grilling basket (5) has been lowered into the internal grilling space.

3. The grill according to claim 1, wherein the grilling basket (5) has an upwardly open V-shape or U-shape configured for receiving food to be grilled therein.

4. The grill according to claim 1, wherein the pivotable front flap (8') comprises a viewing panel made from transparent plastic or glass.

5. The grill according to claim 1, wherein the pivotable front flap (8') forms an extension of the base plate (3) when open.

6. The grill according to claim 1, further comprising a removable drip tray (3'), wherein the removable drip tray (3') can be placed on the base plate (3).

7. A grill for cooking and grilling food to be grilled, comprising:
   a housing which defines an internal grilling space, the housing comprising
      a first side wall (6),
      a second side wall (7) situated opposite the first side wall,
      a top cover wall (4),
      a rear wall (9), and
      a base plate (3),
      wherein the first side wall (6), the second side wall (7), and the rear wall (9) extend upwardly from the base plate (3), and
      wherein the top cover wall (4) extends from the rear wall (9) between upper ends of the first side wall (6), and the second side wall (7), and
      wherein the internal grilling space has a vertical grilling zone;
   at least two radiant heaters (1, 2) which are arranged inside the internal grilling space, situated opposite the first and second side wall (6, 7);
   a grilling basket (5) which can be introduced vertically between the two radiant heaters (1, 2);
   an opening (4') formed in the top cover wall (4) through which the grilling basket (5) can be lowered into the internal grilling space;
   a viewing opening (8") arranged in a front side (8) of the grill;
   two electric ignition devices (13) in form of piezoelectric igniters; and
   a pair of essentially horizontally oriented guides (6', 7') which are arranged on the first and second side wall (6, 7) in each case at the same height below the radiant heaters (1, 2).

8. The grill according to claim 1, wherein the radiant heaters (1, 2) are gas burners which are each connected to a gas supply line (46, 46'), wherein each gas supply line (46, 46') has a connector for a respective gas cartridge (11, 12), wherein the gas cartridges (11, 12) can be arranged on an outside of the rear wall (9) of the housing.

9. The grill according to claim 8, wherein a gas supply to the radiant heaters (1, 2) can be controlled by a controller (10), wherein the controller (10) controls an amount of gas allowed to pass through from the gas cartridges (11, 12) to the radiant heaters (1, 2).

10. The grill according to claim 8, further comprising a removable cover (91) of the housing on a rear side of the grill, wherein the gas cartridges (11, 12) can be arranged between the rear wall (9) and the removable cover.

11. The grill according to claim 1, wherein the housing has ventilation openings (14).

12. The grill according to claim 1, further comprising an integrated time switch, wherein the integrated time switch activates or deactivates the radiant heaters (1, 2).

13. The grill according to claim 1, wherein the radiant heaters (1, 2) are gas burners.

* * * * *